(12) United States Patent
Bober et al.

(10) Patent No.: US 7,897,002 B2
(45) Date of Patent: Mar. 1, 2011

US007897002B2

(54) METHOD OF MODIFYING A SURFACE

(75) Inventors: Andrew M. Bober, Racine, WI (US);
James H. Gaston, II, Racine, WI (US);
Shwn-Meei Y. Linden, Racine, WI (US)

(73) Assignee: Diversey, Inc., Sturtevant, WI (US)

( * ) Notice: Subject to any disclaimer, the term of this patent is extended or adjusted under 35 U.S.C. 154(b) by 0 days.

(21) Appl. No.: 11/742,965

(22) Filed: May 1, 2007

(65) Prior Publication Data
US 2007/0202266 A1 Aug. 30, 2007

Related U.S. Application Data

(62) Division of application No. 10/707,499, filed on Dec. 18, 2003, now abandoned.

(60) Provisional application No. 60/434,499, filed on Dec. 18, 2002.

(51) Int. Cl.
*B44C 1/165* (2006.01)
(52) U.S. Cl. .......................... 156/237; 156/230
(58) Field of Classification Search ................. 156/230, 156/235, 237, 241; 427/407.1
See application file for complete search history.

(56) References Cited

U.S. PATENT DOCUMENTS

| | | | |
|---|---|---|---|
| 4,086,379 A | 4/1978 | Brown | 428/40 |
| 4,440,590 A | 4/1984 | Collins et al. | 156/234 |
| 4,678,690 A | 7/1987 | Palmer et al. | 428/31 |
| 4,795,152 A | 1/1989 | Suiter | 273/51 |
| 4,944,514 A | 7/1990 | Suiter | 273/51 |
| 5,320,693 A * | 6/1994 | Helf | 216/83 |
| 5,322,708 A | 6/1994 | Eissele | 427/147 |
| 5,508,105 A | 4/1996 | Orensteen et al. | 428/323 |
| 5,830,529 A | 11/1998 | Ross | |
| 5,968,624 A | 10/1999 | Liebe, Jr. | 428/40.1 |
| 6,042,881 A | 3/2000 | Ewan | 427/152 |
| 6,258,429 B1 | 7/2001 | Nelson | |
| 6,299,967 B1 | 10/2001 | Collins et al. | 428/211 |
| 6,423,406 B1 | 7/2002 | Bilodeau | 428/347 |
| 6,432,190 B1 | 8/2002 | Scholz et al. | 106/287.11 |
| 6,544,942 B1 * | 4/2003 | Smith et al. | 510/417 |
| 6,872,435 B2 | 3/2005 | Bull et al. | |
| 6,875,497 B2 * | 4/2005 | Emery et al. | 428/195.1 |
| RE39,044 E | 3/2006 | Ross | |
| 2001/0006714 A1 | 7/2001 | Bull et al. | 428/40.1 |
| 2002/0182384 A1 | 12/2002 | Rhein | |
| 2004/0121123 A1 | 6/2004 | Bober et al. | |
| 2008/0085396 A1 | 4/2008 | Bober et al. | |

FOREIGN PATENT DOCUMENTS

| | | |
|---|---|---|
| EP | 0 901 910 A2 | 3/1999 |
| GB | 1 376 003 | 12/1974 |
| GB | 1 500 929 | 2/1978 |
| GB | 2375993 | 4/2002 |
| GB | 2 375 993 A * | 12/2002 |
| JP | 4-275140 | 9/1992 |
| JP | 10-146943 | 6/1998 |
| JP | 11-131775 | 5/1999 |
| JP | 2000-177063 | 6/2000 |
| JP | 2001-38849 | 10/2001 |
| WO | WO 98/43832 A1 * | 10/1998 |
| WO | WO 00/20214 | 4/2000 |
| WO | WO 00/46644 | 8/2000 |

OTHER PUBLICATIONS

U.S. Appl. No. 09/867,063, filed May 29, 2001, Rhein.
GMI Support—Trade Article: *Application for Walk-on Graphics™* May 28, 2003, pp. 1-2.
Specialty Films: *Walk-on-Graphics™ Floor Graphics and Advertising System* May 28, 2003, pp. 1-3.
GMI Support—Trade Article: *Application and Removal Techniques Hi-Stat™ 5300.* Mar. 14, 2003, pp. 1-2.
Floor Graphics: *3M Trim-Line Floor Graphics* Oct. 21, 2002.
Y3K Grafix, Inc. *Image Media Services, Inc.* Oct. 21, 2002, pp. 1-2.
Agio Imaging Grand Format Digital Imaging: *FloorPix™* Mar. 10, 2004, pp. 1-3.
Degussa Construction Chemicals: *Mastertop Dap* Brochure (No date given).
Product Bulletin 164: *3M Controltac™ Plus* Graphic Film 164, Jan. 2004, pp. 1-3.
Product Bulletin 3645: *3M Scotchcal™* Luster Overlaminate 3645, Apr. 2001, pp. 1-3.
FLEXcon: *Carpet Graphics System* Brochure, Feb. 19, 2002, pp. 1-3.
Serigraph: *FLEXmark® V 400* Brochure (no date given).
Instruction Bulletin 529: *3M™ Ink Jet Graphics For Floors* Apr. 2001, pp. 1-3.
Office Action from the U.S. Patent Office for U.S. Appl. No. 10/707,499 dated Jun. 23, 2005 (4 pages).
Office Action from the U.S. Patent Office for U.S. Appl. No. 10/707,499 dated Sep. 23, 2005 (7 pages).
Office Action from the U.S. Patent Office for U.S. Appl. No. 10/707,499 dated Apr. 4, 2006 (6 pages).
Office Action from the U.S. Patent Office for U.S. Appl. No. 10/707,499 dated Nov. 2, 2006 (8 pages).
Office Action from the U.S. Patent Office for U.S. Appl. No. 11/951,082 dated Sep. 17, 2009 (8 pages).
Office Action from the U.S. Patent Office for U.S. Appl. No. 11/951,082 dated Apr. 26, 2010 (9 pages).

* cited by examiner

*Primary Examiner* — William Phillip Fletcher, III
(74) *Attorney, Agent, or Firm* — Gregory S. Bollis

(57) ABSTRACT

This invention provides a method for modifying the appearance of a surface using a thin laminate. The laminate includes an indicia containing layer disposed against the lower surface of a carrier film. The laminate may optionally include a bonding coat or layer for attaching the laminate to a surface, at least one removable protective layer, and a release coating for facilitating the transfer of the laminate on a surface. The method includes applying the floor modifying laminate to at least part of a floor being modified, and can also include applying a curable composition over the laminate and curing the composition.

17 Claims, 1 Drawing Sheet

METHOD OF MODIFYING A SURFACE

CROSS-REFERENCES TO RELATED APPLICATIONS

This application is a divisional application of U.S. Ser. No. 10/707,499 filed on Dec. 18, 2003, now abandoned which was based on U.S. Provisional Ser. No. 60/434,499 filed on Dec. 18, 2002.

FIELD OF THE INVENTION

This invention provides a laminate for modifying the appearance of a surface, surfaces modified with the laminate, and methods for modifying the appearance of a surface with the laminate.

BACKGROUND OF THE INVENTION

Floor care programs today are primarily used to both protect and enhance the appearance of a floor substrate. A variety of materials including vinyl, marble, terrazzo, ceramic, linoleum, wood, etc. are used as floor substrates. Floor care programs can include many different types of products, but generally involve the use of a sealer and/or finish applied to the surface of the floor substrate. This finish is then maintained with the use of cleaners and tools, which can include various buffing or burnishing machines. Although these programs are very effective they are considered a large expense to customers. Additionally, if a surface becomes worn or unsatisfactory over time, it is necessary to entirely remove the floor substrate, to provide a new fresher look to the floor.

In retail locations it is commonplace to place advertising and/or directions in locations readily visible to the customer or client. Recently, several companies have begun producing floor graphics to meet the needs of advertisers. These graphics consist of a printed film covered with some kind of top laminate meant to both protect the graphic and provide a non-slip surface. Unfortunately, many of the floor stickers available today provide for a slip, trip and fall hazard. These graphics, which are applied over the floor finish, are very similar to a sticker in that a backing is peeled off of the graphic, exposing an adhesive. The sticker is then pressed down onto the floor finish. Such stickers are utilized by a variety of end users, but are primarily found in industrial and retail locations where informational data or advertising play an important role in impulse purchasing.

There are many product defects or deficiencies which make the presently available types of graphics less than desirable for use in flooring or other surface applications. These include distorted image, difficulty in application, wearing or tearing of the sticker, difficult maintenance due to use of mechanical equipment used in the floor care process which tend to tear up the edges of the graphic, and thickness of the graphic. Most often these deficiencies result in a poor appearance, low durability and a trip, slip and fall hazard for individuals walking over or around the graphic. Additionally, such graphics tend to accumulate dirt, especially where damage to the graphics has occurred and adhesive residue remains. Further, existing graphics are difficult to remove and sometimes take several coats of the surface finish off during removal thereby requiring that the entire surface be stripped and recoated with a finish. None of these products addresses the situation where it is desirable to change the appearance of the entire surface or a large portion of the surface.

In summary, a considerable number of deficiencies exist in the art relating to appearance modification and enhancing systems related to indoor and outdoor surfaces, such as floor surfaces, wall surfaces, ceilings, windows, vehicle surfaces, driveways, sidewalks, patios, and the like. While prior art stickers provide a means for advertising and including a graphic on a sticker, the poor print quality, difficult application, difficult maintenance, thickness, poor adhesion and/or wearing and tearing, low durability and labor intensive and expensive removal and recoating process make them less than desirable, expensive and time consuming options. Additionally, the danger posed by the worn or lifted edges of such stickers creates a safety hazard. Further, the appearance of such stickers is not very professional and is oftentimes dull or less than crisp. Additionally, when it is desirable to modify the appearance of the entire surface or large portions thereof, few options other than the expensive removal and replacement of the substrate exist.

Thus, there is an ongoing search for an appearance modification system which would enable a surface to be altered partially or in its entirety, which can be quickly and easily applied yet is readily removable and protected from scratches, scuffs, gouges and other damage by maintenance equipment and general wear and tear. In particular, there is a need for an improved appearance modification system which overcomes the shortcomings of the stickers of the prior art.

SUMMARY OF THE INVENTION

One aspect of the invention provides a surface modifying laminate structure containing a thin indicia containing layer disposed on a carrier film. The carrier film serves to facilitate the removal of the laminate from a surface by peeling the laminate away without the need for any stripping agents or other chemicals. Other optional layers in the laminate include a bonding coat or layer for attaching the carrier film and indicia containing layer to a surface, at least one removable protective layer for protecting the carrier film, the indicia containing layer and/or any bonding layer prior to the application of the laminate to a surface, and a release coating between the indicia containing layer, the carrier film, or the bonding coat and the removable protective layer. The bonding coat may be selected to attach the indicia containing layer in a removable or repositionable manner.

Another aspect of the invention provides a surface modification system which includes an indicia containing layer disposed on a carrier film and a surface onto which the system is to be applied. Optionally, the system may also include at least one top coat applied over at least a portion of the laminate and over at least a portion of the surface adjacent the laminate. The system may additionally include at least one base coat applied to the surface prior to application of the laminate to the surface. The combination of the carrier film and the indicia containing layer in such a system should be sufficiently thin to provide a minimal difference between the height of the surface without the laminate and the height of the surface having the laminate applied thereon. In some embodiments, the laminate is disposed on at least a portion of the surface whereby the remaining portion of the surface is devoid of laminate. In other embodiments the laminate is applied over the entire surface.

The inventive system also optionally includes a surface cleaner for cleaning a surface to which an indicia containing layer has been applied. Such cleaners include neutral cleaners, alkaline cleaners, acidic cleaners, cleaner/maintainers and maintainers, including polymeric type cleaners. During surface cleaning the indicia containing layer remains intact and is not degraded or damaged by the cleaning material or process.

In practice, application of the surface modifying laminate to a surface comprises the following steps. It is advisable, but not required, that the surface be properly cleaned prior to the application of the laminate to remove dirt or debris which may adversely affect the overall appearance of the laminate covered surface. The next step involves positioning or disposing the laminate, indicia containing layer side down, on at least a portion of the surface. After such positioning, a top coat may be applied over at least a portion of the laminate and the surface. In some embodiments a base coat layer may be applied to the surface after the cleaning step but prior to positioning the laminate on the surface.

In certain constructions, the surface modifying laminate is strong enough that it may be readily removed from the surface simply by peeling the carrier film away from the surface. In a process for removing the laminate from an enhanced surface wherein at least a portion of the laminate is disposed below a top coat, conventional means may be employed to remove the top coat prior to the removal of the laminate.

DETAILED DESCRIPTION OF THE PREFERRED EMBODIMENTS

The present invention is directed to surface modification laminates used to modify or enhance a surface and to surface modification systems that include the laminates. Such laminates and systems enable modification or enhancement of a surface with visual images and/or text disposed on at least a portion of the surface. Alternatively, the entire appearance or color of the surface can be modified.

The present invention has potential applications on any surface where visual images, text, color, graphics and/or designs can be applied to provide a modified visual appearance of the surface. Such surfaces may be found both indoors and outdoors on such objects as architectural structures, vehicles and consumer products. As used herein, the term architectural structure includes building structures, such as floors, walls, ceilings, windows, roofs, patios, shelves, and stairs, and ground cover structures, such as roads, driveways, and sidewalks. Examples of vehicles to which the surface modifying laminates may be applied include, automobiles, aircraft, watercraft, trucks, motorcycles, and bicycles. Toys and appliances are only two of many consumer products to which the surface modifying laminates may be applied. The surface to be modified may be made from a vast variety of materials, including, but not limited to, vinyl, marble, terrazzo, ceramic, linoleum, wood, metal, plastic, rubber, gypsum board, plaster, concrete, stone, vinyl composition tile, and glass.

Figure 1:
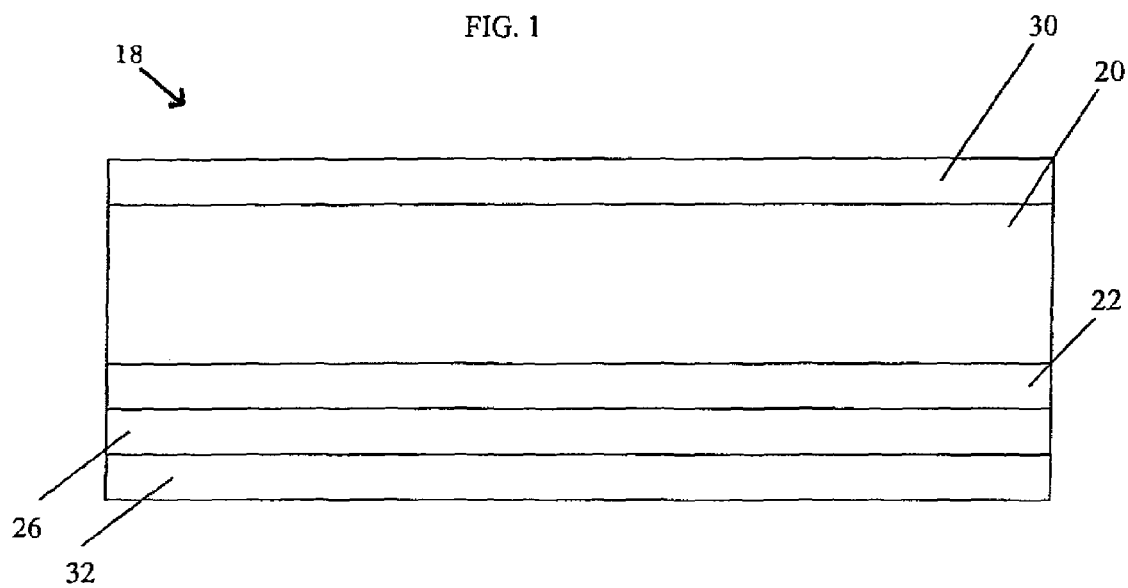
FIG. 1 is a cross-sectional view illustrating an exemplary surface modifying laminate according to the present invention.
Figure 2:
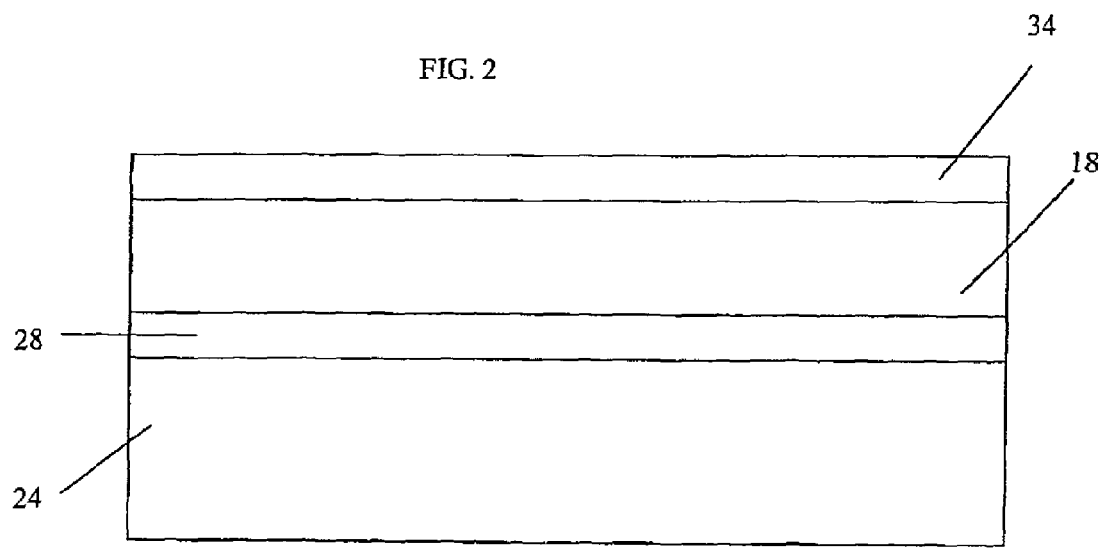
FIG. 2 is a cross-sectional view of a surface to which the surface modifying laminate of the present invention has been applied. Although the laminate structure is depicted as a single block in FIG. 2, it should be understood that the laminate actually includes multiple layers, as shown in FIG. 1.

FIGS. 1 and 2 show exemplary embodiments of the invention. As shown in FIG. 1, the laminate structure 18 includes a carrier film 20 and an indicia containing layer 22 disposed on the lower surface of the carrier film 20. In the structure exemplified in FIG. 2, the surface 24 to be modified is at least partially covered by the carrier film 20 onto which the indicia containing layer 22 has been disposed. The surface modifying laminate of FIG. 1 and the surface modifying system of FIG. 2 further include, a bonding coat 26 disposed against the lower surface of the carrier film 20, and a top coat 34 applied over the top of the laminate structure. A base coat 28 is also shown in FIG. 2, sandwiched between the surface to be modified 24 and the bonding coat 26. Additionally, the present invention can include removable protective layers 30 and 32. Upper removable layer 30 is designed to protect the upper surface of the carrier film 20 and lower removable layer 32 is designed to protect the indicia containing layer 22 and/or any bonding coat 26 applied thereto and/or any portion of the lower surface of the carrier film 20 not having any indicia containing layer or bonding coat disposed thereon, if any. Although not shown in the figures, the laminate may also include a release coat between the upper removable layer and the carrier film and/or between the lower removable layer and the exposed lower surface of the carrier film or any bonding coat applied thereto.

The carrier film facilitates the transfer of the indicia containing layer to the surface to be modified and removal of the laminate from the surface. The inventors have surprising and unexpectedly discovered that the carrier film is selected and designed such that the carrier film, along with the indicia containing layer disposed thereon, may be readily removed by peeling the laminate layer away from the surface, either in a single sheet or in smaller pieces. This eliminates the need for conventional stripping agents and makes the removal process, less expensive, less energy intensive, and less time consuming. It also eliminates the need for stripping chemicals which pose a hazard to both the user and the environment.

The carrier film should be thin so that the thickness of the seam between the surface and the laminate is minimized. In some embodiments the carrier film has a thickness of 8 mils or less. This includes embodiments where the carrier film has a thickness of 6 mils or less, embodiments where the carrier film has a thickness of 4 mils or less, and embodiments where the carrier film has a thickness of 2 mils or less, and embodiments where the film has a thickness of 0.5 mils or less, where a "mil" is defined as one one-thousandth of an inch. The choice of film thickness will depend, at least in parts on the intended application and location of the laminate. Additionally, the type of film will impact the film strength. Thus, it may be possible to utilize films of particular materials in a thinner dimension while maintaining sufficient strength to be peeled away from the surface without tearing or with only minor amounts of tearing. A thinner film might be more desirable where it is imperative that the transition from the surface to the laminate is nearly imperceptible. Alternatively, a thicker film might be used to smooth out an underlying surface that is uneven, rough, or damaged.

The carrier film may be made from any material onto which the indicia containing layer may be applied or printed. Examples of suitable materials for the carrier film include, but are not limited to, fabrics, foils, polymeric sheeting, and paper. Specific examples of suitable polymeric sheeting materials include, but are not limited to, polypropylene films, polyacetal films, polyamide films, polyanhydride films, polyester films, polyolefin films, polystyrene films, polyvinyl chloride films, polyvinylidene chloride films, polyurethane films, polyurea films, and the like. In some embodiments the carrier film is transparent, such that the indicia containing layer in visible through the carrier film.

The indicia containing layer may comprise a design, picture, graphic, text, or the like and may exist as a continuous or discontinuous layer on the carrier film. In some embodiments the indicia containing layer may be a substantially continuous layer covering substantially the entire carrier film. The indicia containing layer is made from an ink, pigment, or dye formulation which may contain any suitable ink, dye, or pigment that is capable of being applied, for example by dry transfer or printing, to the lower surface of the carrier film. In some embodiments the graphic provided by the indicia containing layer gives the appearance of a painted graphic or even a photograph. In some embodiments, the ink, pigments, or dyes are readily dissolvable in water or common organic solvents, are readily removable, and do not migrate or diffuse into the adjacent carrier layer, base coat or top coat of the system. Suitable inks include UV cured inks, water based inks, or solvent based inks. The indicia containing layer may be a multi-colored layer and the inks, dyes, and/or pigments that make up the layer may be contained in a single stratum or multiple strata within the indicia containing layer. In some embodiments the ink formulation is a 100% active formulation.

As noted above, the present invention may optionally include a bonding coat on the lower surface of the indicia containing layer or any portion of the lower surface of the carrier film devoid of the indicia containing layer as shown in FIG. 1, where the lower surface is the surface that will be face down with respect to the surface once the laminate is applied. Such a bonding coat can be made from an adhesive which serves to adhere the indicia containing layer and carrier film to the surface. The tackiness of the adhesive may vary over a broad range depending on the intended application of the laminate. As used herein, the term "tack" refers to the rate at which an adhesive bond forms between two surfaces. As one of skill in the art will recognize, the tack of certain adhesive may be influenced by the thickness of the adhesive layer. In embodiments where it is desirable to provide a surface modification system wherein the laminate is readily removed from the surface, the adhesive should be selected such that it bonds preferentially to the carrier film, rather than the surface to be modified. In certain embodiments the tack of the adhesive will range from 50 to 2000 grams per square centimeter. This includes embodiments where the tack of the adhesive ranges from 100 to 1500 grams per square centimeter, and further includes embodiments where the tack of the adhesive ranges from 150 to 1000 grams per square centimeter.

The bonding coat or layer should be thin in order to minimize the combined thickness of the bonding layer, the indicia containing layer, and the carrier film. In various embodiments the combined thickness of these three components is 8 mils or less, 6 mils or less, 5 mils or less, 4 mils or less and even 2 mils or less. Suitable adhesives for use in the bonding coat or layer include pressure sensitive adhesives. In some embodiments, the pressure sensitive adhesives are non-curing adhesives or adhesives that do not require curing after application, because such adhesives may be more easily removed from some surfaces. For example, in some embodiments, curable epoxies are avoided. Other suitable adhesives include temperature sensitive adhesives, repositionable adhesives, or any other suitable adhesive known to one of ordinary skill in the art. Examples of suitable pressure sensitive adhesives include, but are not limited to those disclosed in U.S. Pat. Nos. 4,845,149; 4,879,333; and 4,923,919, which are incorporated herein by reference. In some embodiments the bonding coat can include a supported adhesive.

The bonding coat may be applied directly to the lower surface of the indicia containing layer or any exposed portion of the lower surface of the carrier film or may first be applied to the surface of a protective removable layer, of the type described below, which is then disposed adjacent to the lower surface of the indicia containing layer or exposed lower surface of the carrier film, sandwiching the adhesive coating between the indicia containing layer and the removable protective layer. In this embodiment it is advantageous if the adhesive bonds preferentially to the indicia containing layer and/or any exposed portion of the lower surface of the carrier film such that it is transferred along with the indicia containing layer and carrier film onto the surface to be modified. The bonding coat may be applied to the surface of the indicia containing layer, any exposed portion of the lower surface of the carrier film or the protective layer by any conventional means. For example, the adhesive may be spray coated, rolled or printed onto the indicia containing layer and carrier film or protective layer. In some embodiments the bonding coat dissolves readily in mild detergents. Alternatively, the bonding may be applied directly to the surface to be modified, or a portion thereof, and the indicia containing layer and carrier film may subsequently be adhered to the adhesive.

In some embodiments, the bonding coat may be omitted. For example, an external source may be utilized to maintain the position of the indicia containing layer and carrier film on the surface to be modified during application of a top coat over at least a portion of the laminate such that the top coat secures the laminate to the surface.

As noted above, the indicia containing layer may optionally include a removable protective layer disposed below the indicia containing layer and/or above the carrier film. The lower removable protective layer, namely the protective layer below the indicia containing layer, protects the indicia containing layer from damage during handling. A release coating may be included between the lower removable protective layer and the indicia containing layer in order to facilitate the transfer of the indicia containing layer to the surface to be modified. In some embodiments the laminate includes an upper removable protective layer disposed next to the upper surface of the carrier film. In such embodiments, a bonding coat as described above, may be included between the removable protective layer and the indicia containing layer. In this construction the removable protective layer serves to prevent debris from collecting in the adhesive and to prevent the adhesive from attaching to a surface prematurely.

The upper and lower removable protective layers may be made from the same or different materials. Suitable materials include, but are not limited to, plastics, such as polyester, polypropylene, or polyethylene. The removable protective layer or layers may optionally be transparent materials. In some embodiments the removable protective layer or layers are made from paper which may optionally be coated paper. This has the advantage of significantly lowering the cost of production of the surface modifying laminates. In addition, because the paper may be readily recycled, this embodiment saves energy and reduces waste.

Suitable materials for use in release coats are well known and include, but are not limited to, polyvinyl chloride and acrylics designed to facilitate the release of the removable layer or layers from the carrier film, the indicia containing layer or the bonding coat. The release coat may be designed to remain substantially adhered to the removable protective layer after the transfer of the remainder of the laminate to the surface to be modified. Alternatively, the release coat may be designed to remain substantially adhered to the indicia containing layer, the bonding coat, or the carrier film after the transfer. In the latter design, the release coat is referred to as a breakaway coating. The breakaway coating should be selected and designed such that it does not substantially affect the thickness of the applied laminate and assimilates with the indicia containing layer without negatively affecting the appearance of that layer. In other embodiments the release coat is split between the indicia containing layer or the carrier film and the removable protective layer upon the removal of the latter. In various embodiments, the combined thickness of the carrier film, the indicia containing layer, any bonding coat and any release coating is 8 mils or less, 6 mils or less, 5 mils or less, 4 mils or less, or even 2 mils or less.

After the application of the surface modifying laminates to the surface to be modified, at least one top coat may be disposed over at least a portion of the laminate and over at least a portion of the surface adjacent the laminate. The top coat may be any conventional sealant or finish and may be applied as a solid or a liquid top coat. Such top coats are well known and commercially available and are generally used to impart shine, dirt resistance, water resistance, and/or scratch/wear resistance to the surface. The top coat may help adhere the laminate to the surface to be modified and to further smooth out the already extremely narrow edges of the laminate. Another advantage provided by the top coat is that it provides a surface having a single coefficient of friction which helps prevent trips, slips and falls. However, the top coat is not required.

For many applications, such as floor applications, it is desirable for a surface finish to provide a slip-resistant surface or a surface having a single coefficient of friction which helps prevent trips, slips and falls. In some instances, the flexible film may provide a sufficiently slip-resistant surface, however, when it is desirable to increase the slip-resistance of the film, a top coat which provides a coefficient of friction higher than that of the film may be applied over at least a portion of the film. In some embodiments the top coat may provide a non-slip surface. As used herein, a "non-slip" surface is a surface having a coefficient of friction of at least 0.5 as measured by ASTM D 2047, a standard test method for determining the static coefficient of friction of polish-coated floor surfaces as measured by the James Machine. This includes embodiments where the top coat provides a surface having a coefficient of friction of at least 0.55, further includes embodiments where the top coat provides a surface having a coefficient of friction of at least 0.6, still further includes embodiments where the top coat provides a surface having a coefficient of friction of at least 0.65, yet further includes embodiments where the top coat provides a surface having a coefficient of friction of at least 0.7, and even further includes embodiments where the top coat provides a surface having a coefficient of friction of at least 0.75.

Examples of suitable top coats include, but are not limited to, polymeric top coats, such as acrylic finishes. Specific examples of such top coats include styrene acrylics, urethane acrylics, urethanes, including polyurethanes, vinyls, epoxies, and the like. Such top coats may or may not be alkali-soluble top coats. Such top coats can be cured or uncured, permanent or non-permanent. As used herein, a "cured" coating includes coatings that are formed by the evaporation of a solvent and the coalescence of the solid film without crosslinking (i.e. "evaporatively-cured" coatings) and coatings that are formed by crosslinking reactions. Suitable, commercially floor finishes for use as top coat herein include SIGNATURE floor finish, VECTRA floor finish, PREMIA floor finish, JONWOOD Waterborne wood floor finish, all of which are available from JohnsonDiversey, Inc. In various embodiments, the combined thickness of the laminate and any top coat is 8 mils or less, 6 mils or less, 5 mils or less, 4 mils or less, or even 2 mils or less. However, it is not imperative that the top coat be particularly thin.

Suitable commercially available cured floor finishes for use with the floor finish systems provided herein include Signature, a metal interlock styrene-acrylic finish that cures at ambient temperatures, available from JohnsonDiversey, Inc. (Racine Wis.). Suitable commercially available evaporatively-cured floor finishes include ZF-175, Linobase, and JX-4000, available from JohnsonDiversey, Inc. (Racine, Wis.). Conventional floor finishes mixed with crosslinking hardeners may also be employed. For example, Signature may be mixed with about 1% polyaziridine to provide a more durable crosslinked finish.

As noted above, at least one base coat may be disposed between the surface to be modified and the carrier film of the laminate. Suitable base coats are well known and commercially available. The base coat can be of similar or identical composition to the top coat, as previously discussed, or a different composition.

Further embodiments of the present invention allow for a first surface modifying laminate to be applied to a surface, followed by the application of a top coat over at least a portion of the first surface modifying laminate, and the subsequent application of a second surface modifying laminate disposed on top of the top coat, optionally followed by an additional top coating. Further, alternating layers of laminate and top coats can be utilized to achieve a desired effect. In such an embodiment, as in previous embodiments, a base coating layer can be disposed on top of the surface prior to application of the first surface modifying laminate. In these multi-layered constructions, the uppermost laminate may be made from a series of individual portions or patches of laminate. This embodiment is useful because monitoring the degree of disappearance of the uppermost laminate allows the user to determine when the surface requires reapplication of a top coat over the lower laminates. The ability to provide multiple layers of laminates is also advantageous because it allows the lower laminates to be patched in order to fix holes or cover damage. Further, it provides for optional layering of laminates to easily modify the appearance of a surface, for example, to match seasonal décor or displays.

In readying the surface for application of a surface modifying laminate, it is recommended, but not required, that the surface initially be cleaned or stripped to remove dirt, debris or similar waste, as well as any inferior coatings applied on the surface. Conventional cleaners including neutral cleaners, alkaline cleaners, acidic cleaners, cleaners/maintainers, or maintainers including polymeric cleaners, may be utilized for this purpose. One such cleaner is JWP UHS Cleaner available from JohnsonDiversey, Inc. Dust mopping, or similar light cleaning may be utilized to remove the majority of the dust and dirt. After cleaning and stripping, the laminate is positioned on the surface. The film may be applied beginning at one edge by adhering an edge of the film to the surface, using any adhesive coated on the lower surface of the film or a strip of tape, and spreading (e.g. rolling) the film outwardly from that edge, pressing it onto the surface as it spreads. A tool having a flat edge may be utilized to uniformly apply the film to the surface and remove any bubbles, wrinkles, etc. Such tools include, rubbing sticks, rigid blades, flat-bladed squeegees, T-bars, including weighted T-bars and rollers, including heated and/or weighted rollers. Any bubbles remaining in the film after application may be removed by pricking the bubbles with a pin or similar object to release trapped air or liquid. If the laminate is packaged with one or more removable protective layers, those layers are removed, exposing the indicia containing layer or the bonding coat, if present, and applying the laminate to the surface, typically by applying light pressure. A rubbing stick, squeegee or roller may be utilized to uniformly apply the laminate to the surface and remove any bubbles, wrinkles, etc. After the laminate is suitably placed and positioned on the surface to be modified, any removable layers may be peeled away. Next, a top coat may be disposed over at least a portion of the laminate. Multiple layers of the top coat may be applied.

Alternatively, a water release or water slide technique can be utilized to position the laminate on the surface whereby the laminate is positioned above the surface and moisture is applied to slide the indicia containing layer and carrier film off of a removable protective layer and onto the surface.

The inventors have surprisingly and unexpectedly discovered that bubbles in the film may be reduced or eliminated by first applying a thin layer or mist of a liquid wetting agent having a surface tension, equal to or less than the surface tension of water to the surface to be finished, or to the lower surface of the indicia containing layer prior to the application of the indicia containing layer and film to the surface such that the liquid wetting agent is disposed between the indicia containing layer and the surface to be finished or modified, after the laminate is applied to such surface. Suitable liquid wetting agents include water, conventional cleaning solutions including alcohol-containing cleaners, acidic cleaners, alkaline cleaners, maintainers, and floor finishes similar to those used herein as a top coat.

Bubbles may also be reduced by using an air or liquid permeable film or by using a film that has one or more perforations to allow any liquid or air trapped below the film to escape as the film is flattened onto the surface. The perforations may include holes of various shapes, however narrow slits or pin holes are preferred because they allow air and liquid to escape without significantly reducing the smoothness of the film. This is desirable because a rough surface may wear out faster as dirt collects in rough areas and edges become frayed. Thus, the number of perforation is desirably sufficient to reduce the number of bubbles without unnecessarily roughening the surface of the film or weakening the film. In some embodiments, the films have an average of at least 1 perforation per square foot. This includes embodiments where the films have an average of at least 10 perforations per square foot. In some embodiments, the films have an average of no more than about five hundred perforations per square foot. This includes embodiment where the films have an average of no more than about two hundred perforations per square foot, further includes embodiments where the films have an average of no more than about one hundred perforations per square foot and still further includes embodiments where the films have an average of no more than about fifty perforations per square foot.

The flexible films may be provided in sheets or rolls and may be applied as a single sheet or in multiple smaller film segments. The film segments may take on a variety of shapes, but desirably include one or more straight edges. Suitable shapes include rectangles and squares. When multiple film segments are laid down they are desirably disposed adjacent each other with edges in contact, but not overlapping. This process may be facilitated using a laser-guided chalk line to help establish straight rows and clean butt joints.

Maintenance of a laminate-modified surface according to the present invention, may be handled by utilization of commonly used cleaners, including neutral cleaners, alkaline cleaners, acidic cleaners, polymeric cleaners and polymeric maintainers. Commonly available products such as JWP Stride Cleaner available from JohnsonDiversey, Inc. can be utilized. After the cleaner is applied to the surface, an agitating force sufficient to remove dirt from the laminate without damaging the laminate may be applied. This may be accomplished with commonly used mechanical tools such as autoscrubbers and buffers.

It should be noted that the layer thicknesses depicted in the figures, is for illustration purposes only and is in no way meant to reflect the actual thickness of each layer or its relative thickness with respect to any other layer.

These embodiments represent a few possibilities for the inventive appearance enhancement and modification system of the present invention. While the principles of this invention have been described in connection with specific embodiments, it should be understood clearly that these descriptions are made only by a way of example and are not intended to limit the scope of the invention.

What is claimed is:

1. A method for modifying a floor, the method comprising:
   (a) applying a floor modifying laminate to a floor to be modified, the laminate comprising a carrier film having an upper surface and a lower surface and an indicia-containing layer disposed on at least a portion of the lower surface of the carrier film, the film at least partially covering the floor to be modified and removable therefrom by peeling;
   (b) adhering the laminate to the floor with a bonding layer bonding preferentially to the laminate rather than the floor;
   (c) applying a curable composition over at least a portion of the upper surface of the carrier film;
   (d) curing the composition to provide a cured polymer top coat wherein the carrier film is a transparent film, such that the indicia-containing layer is visible through the carrier film and the top coat is a sealant or finish;
   (e) peeling the carrier film with the indicia-containing layer from the floor after curing the composition; and
   (f) after curing the composition, overcoming the adhesion between the bonding layer and the floor while retaining the bonding layer on the laminate by peeling the carrier film.

2. The method of claim 1, further comprising applying a liquid wetting agent having a surface tension equal to or less than the surface tension of water to the floor to be modified, to the lower surface of the carrier film, or to the indicia containing layer prior to applying the laminate to the floor, such that the liquid wetting agent is disposed between the indicia containing layer and the floor to be modified after the laminate is applied to the floor to be modified.

3. The method of claim 1, wherein the indicia-containing layer is a substantially continuous layer covering substantially the entire carrier film.

4. The method of claim 1, wherein the indicia-containing layer is printed onto the lower surface of the carrier film.

5. The method of claim 1, wherein the carrier film is perforated.

6. The method of claim 1, wherein the carrier film comprises a film selected from the group consisting of polypropylene films, polyacetal films, polyamide films, polyanhydride films, polyester films, polyolefin films, polystyrene films, polyvinylchloride films, polyvinylidene chloride films, polyurethane films, and polyurea films.

7. The method of claim 1, wherein the top coat is not an alkali-soluble top coat.

8. The method of claim 1, wherein the top coat is a crosslinked top coat.

9. The method of claim 1, wherein the top coat is a permanent top coat.

10. The method of claim 1, wherein the top coat is selected from the group consisting of acrylic coatings, polyurethane coatings, vinyl coatings and epoxy coatings.

11. A method for modifying a floor, the method comprising:
    (a) applying a floor modifying laminate to the floor to be modified, the laminate comprising a perforated carrier film having an upper surface and a lower surface and an indicia-containing layer disposed on at least a portion of the lower surface of the carrier film, the film at least partially covering the floor to be modified and removable therefrom by peeling, wherein the carrier film is a transparent film, such that the indicia-containing layer is visible through the carrier film;

(b) adhering the laminate to the floor with a bonding layer bonding preferentially to the laminate rather than the floor;

(c) applying a curable composition over at least a portion of the upper surface of the carrier film;

(d) curing the composition to provide a cured polymer top coat;

(e) peeling the perforated carrier film with the indicia-containing layer form the floor after curing the composition; and (f) after curing the composition, overcoming the adhesion between the bonding layer and the floor while retaining the bonding layer on the laminate by peeling the carrier film.

12. The method of claim 11, wherein the indicia-containing layer is a substantially continuous layer covering substantially the entire carrier film.

13. The method of claim 11, wherein the indicia-containing layer is printed onto the lower surface of the carrier film.

14. The method of claim 11, wherein the carrier film comprises an average of at least 1 perforation per square foot.

15. The method of claim 11, wherein the carrier film comprises an average of no more than about 200 perforations per square foot.

16. The method of claim 11, wherein the carrier film comprises a film selected from the group consisting of polypropylene films, polyacetal films, polyamide films, polyanhydride films, polyester films, polyolefin films, polystyrene films, polyvinylchloride films, polyvinylidene chloride films, polyurethane films, and polyurea films.

17. The method of claim 11 wherein said top coat is a sealant or finish.

\* \* \* \* \*